Nov. 20, 1951 — S. D. RUSSELL — 2,575,531
BEARING GUARD
Filed Oct. 8, 1947

Inventor:
Stanley D. Russell,
By Soans, Pond & Anderson
Attys

Patented Nov. 20, 1951

2,575,531

UNITED STATES PATENT OFFICE 2,575,531

BEARING GUARD

Stanley D. Russell, Racine, Wis., assignor to J. I. Case Company, Racine, Wis., a corporation of Wisconsin Application October 8, 1947, Serial No. 778,643

5 Claims. (Cl. 308—36.1)

1

The present invention relates to an improved bearing construction for agricultural implements, and, in particular, to an improved shield or bearing guard for preventing weed stalks, grass, etc. from becoming entangled in the bearing and about the associated shaft.

In various agricultural implements, for example, implements using pickups, it is necessary for constructional reasons to use relatively open shafts. The operation of such implements in fields having crops with long, flexible stalks has been extremely difficult because of the tendency of the stalks to wrap around the open rotating shafts of the implement. The stalks may become so tightly wedged around a shaft, adjacent its supporting bearings, on windrow pickups, side delivery rakes and the like, that the power requirements of the apparatus become excessive and the stalks may even cause the misalignment of the moving parts with resultant severe damage to the entire apparatus. As a result, during the operation of such apparatus it is necessary for the operator to stop the equipment at frequent intervals in order to hack out the weeds which have become entangled in the bearings, so as to assure efficient and trouble-free operation of the apparatus. The task of cleaning the various bearings of the equipment becomes quite laborious and consumes a large amount of time, especially when there are a large number of open shafts on a single piece of apparatus such as on a pickup, hay baler, or on a thrashing machine.

The principal object of the invention is to provide a bearing shield or guard for apparatus of the class described which will prevent stalks and the like from interfering with the efficient operation of the associated bearing. Other objects and advantages of the invention will become known from reference to the following description of the accompanying drawings of one embodiment of the invention.

Figure 1:
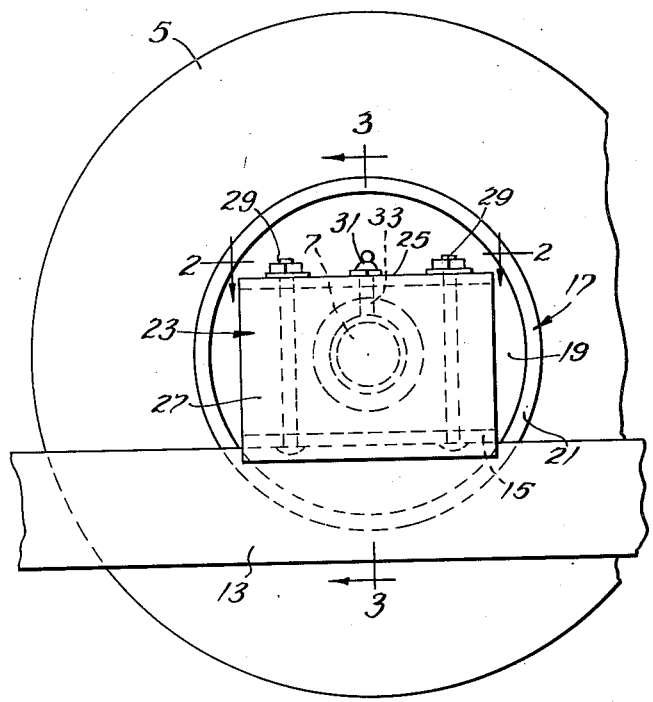
Fig. 1 is an end, elevational view, of a bearing guard, in accordance with the invention.
Figure 3:
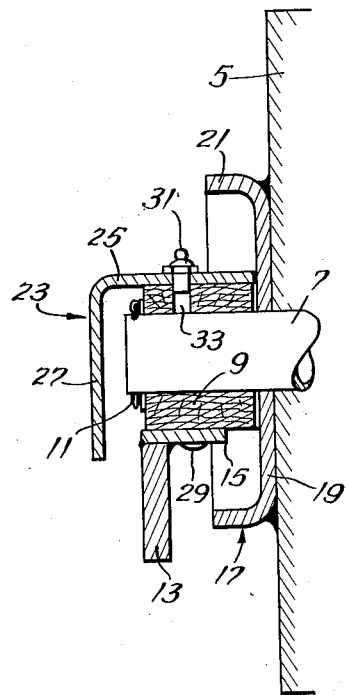
Fig. 3 is a sectional view taken on line 3—3 of Fig. 1.

In the structure illustrated the bearing guard of the invention is associated with a conventional pickup reel such as is used in a hay baler or a forage harvester. The reel includes a drum 5 which is supported upon a shaft 7 which is rotatably journaled into an oil-soaked wood block bearing 9 such as is commonly used in farm implement construction. For the purpose of neutralizing the end thrust of the shaft 7, a washer and cotter key assembly 11, or the like, is provided on the end of the shaft 7 which extends through the bearing. The bearing 9 is supported upon a frame member 13 of the apparatus by means of a bracket 15 which extends inwardly from the frame member 13 so as to provide a suitable supporting surface for the bearing 9.

The bearing guard of the invention includes a cup-shaped shield 17 which is on the drum 5 and which comprises a flat, circular, base plate 19 having an annular band or rim 21 disposed about its periphery so as to extend perpendicular to the central portion of the base plate 19. The center of the base plate 19 is provided with a cut-out portion so that it can fit around the shaft 7 and rotate with the drum 5.

In the illustrated construction, the cup-shaped shield 17 is attached to and rotates with the drum 5 during operation. The circular base plate 19 is integrally attached to the pickup drum 5 so that the annular rim 21 extends outwardly from the drum 5 and protectively surrounds the bearing 9. A cooperating guard for the end of the shaft 7 and the washer and cotter key assembly 11, is provided by an angle member 23 which is attached to the upper portion of the bearing 9. The angle member 23 includes a pair of legs or plate members 25 and 27 which are disposed at right angles to one another. One of the plate members 25 is disposed in a horizontal plane and is attached to the bearing 9 by means of a pair of bolts 29 which also attach the bearing 9 to the bracket 15 on the frame 13 of the implement. The other plate member 27 of the angle member 23 extends downwardly across the outer face of the bearing so as to enclose the free end of the shaft 7 and the washer and cotter key assembly 11. A suitable hole in the horizontal plate member 25 is provided with a grease fitting 31 which permits the introduction of a lubricant into an oil chamber 33 in the bearing 9.

Figure 2:
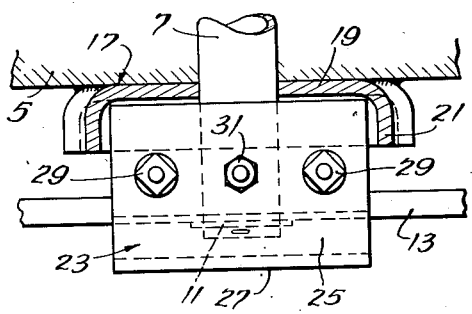
Fig. 2 is a sectional view taken on line 2—2 of Fig. 1.
Figure 4:
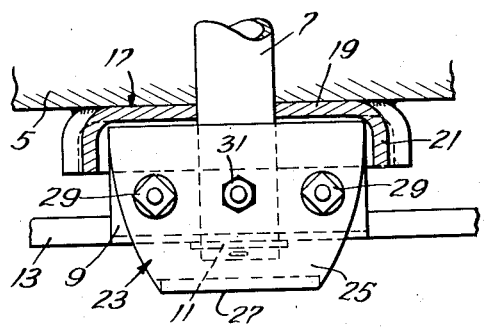
Fig. 4 is a view similar to Fig. 2 showing a modified form of a bearing guard.

The horizontal leg or plate member 25 of the angle member 23 is proportioned so that it fits within the cup-shaped shield 17. The edges of the horizontal leg 25 extend generally parallel to the inner surface of the rim 21 and coact with both the flat base plate 19 and with the perpendicular annular rim 21 which extends therearound. The downwardly extending leg or plate member 27 of the angle member 23 may extend completely across the bearing 9, as illustrated in Fig. 2. In some instances it may be desirable to taper the horizontal leg 25 as it extends outwardly so that the downwardly extending leg 27 is narrowed to cover the end of the shaft 7 (Fig. 4).

During use the outwardly extending rim 21 on the face plate 19 provides a large surface which will deflect most of the stalks away from the space between the bearing and the surface of the reel. Any stalks which may wrap around the bearing are, however, automatically cut away by means of the cooperating action of the stationary horizontally extending leg or plate member 25 of the angle member 23 and the inner surface of the annular rim. It is important that the horizontal surface of the angle member be proportioned to fit closely adjacent the cup shaped shield 17 so as to effectively coact with the inner surface of the rim and the base plate 19, as shown in Figs. 1 and 2. For usual crop conditions it has been found that the desired cooperation will result if clearance between the inner surface of the rim of the cooperating horizontal member is within the range of from about $\frac{1}{16}$ inches to $\frac{5}{16}$ inches. It is desirable under all conditions, to provide square corners on the angle member so that it is sharp enough to cut the stalks which are deflected from the reel by the rim of the base plate, and in some instances ribs or projections can be provided on the inner surface of the rim.

A bearing guard in accordance with the invention, assures efficient and trouble-free operation of the bearings on farm machinery even under the most adverse conditions.

Various of the features of the invention which are believed to be new are set forth in the appended claims.

I claim:

1. In combination with a rotatable member having a supporting shaft and a bearing block for said shaft, a guard of the class described including a cup-shaped member having a circular base plate and an annular rim disposed therearound, means for rigidly attaching said cup-shaped member to said rotatable member in a manner such that said annular rim extends outwardly from said rotatable member and is concentric with said shaft, said rim being proportioned to extend over at least a portion of, and protectively around, said bearing block, and a generally horizontally extending plate member attached to one face of said bearing block, said plate member being proportioned to fit within said cup-shaped member and having edges which are closely adjacent the base of said cup-shaped member and said annular rim whereby rotation of said rotatable member causes said annular rim and said plate member to coact so as to prevent crop material from becoming entangled about said shaft.

2. In combination with a rotatable member having a supporting shaft and a bearing block for said shaft, a guard of the class described including a cup-shaped member having a circular base plate and an annular rim disposed therearound, means for rigidly attaching said cup-shaped member to said rotatable member in a manner such that said annular rim extends outwardly from said rotatable member and is concentric with said shaft, said rim being proportioned to extend over at least a portion of, and protectively around, said bearing block, and an angle member for cooperating with said rim comprising a pair of angularly disposed plate members, one of which is attached to said bearing block and is proportioned to fit closely within said cup-shaped member so that its edges coact with the base plate of said cup-shaped member and with said annular rim so as to prevent crop material from becoming entangled about said shaft, the other of said angularly disposed plate members extending downwardly across the outer face of said bearing block so as to protectively surround the outer end of said shaft.

3. In combination, a rotatable member, a shaft on which said member is supported, support means for said shaft including a bearing, and a bearing guard of the class described, said bearing guard comprising an annular rim attached to and rotatable with said rotatable member, said rim extending over a portion of, and protectively around, said bearing, and a plate member which is attached to said support means and which is proportioned to fit within said rim, said plate member extending to angularly spaced points on said rim, whereby said plate member co-acts with said rim when said rotatable member is rotated to prevent material from becoming entangled about said shaft.

4. In combination, a rotatable member, a shaft on which said member is supported, support means for said shaft including a bearing, and a bearing guard of the class described, said bearing guard including an annular rim located on and connected to said rotatable member for rotation therewith, said annular rim extending outwardly over at least a portion of, and protectively around, said bearing, and a plate member which is attached to said support means and which extends therefrom toward said rim, said plate member having an extreme edge which extends generally parallel to the inner surface of said annular rim, said edge of said plate member being closely adjacent the inner surface of said rim and extending across a major portion of the width of said rim, whereby said plate member coacts with said rotating rim to prevent crop material from becoming entangled about said shaft.

5. In combination a rotatable member, a shaft on which said member is supported, support means for said shaft including a bearing block, and a bearing guard of the class described, said bearing guard including a cup-shaped member which defines a generally annular surface extending outwardly over at least a portion of, and protectively around, said bearing block, said cup-shaped member being connected to, and rotatable with, said rotatable member, and the inner surface of said cup-shaped member constituting a surface of rotation about the axis of said shaft, and a plate member which is attached to said bearing block and which extends therefrom to a pair of angularly spaced points on said cup-shaped member, said plate member having outward edges which extend closely adjacent and parallel to the inner surface of said cup-shaped member, whereby said plate member coacts with said cup-shaped member to prevent crop material from becoming entangled about said shaft.

STANLEY D. RUSSELL.

REFERENCES CITED

The following references are of record in the file of this patent:

UNITED STATES PATENTS

| Number | Name | Date |
|---|---|---|
| 1,292,799 | Kendall | Jan. 28, 1919 |
| 1,362,910 | Zoeller | Dec. 21, 1920 |
| 2,243,010 | Iversen | May 20, 1941 |